United States Patent [19]

Garnier et al.

[11] Patent Number: 4,661,137
[45] Date of Patent: Apr. 28, 1987

[54] PROCESS FOR PRODUCING GLASS MICROSPHERES

[75] Inventors: Patrick Garnier, Paris; Daniel Abriou, Gagny; Michel Coquillon, Chauconin/Neufmontiers, all of France

[73] Assignee: Saint Gobain Vitrage, Courbevoie, France

[21] Appl. No.: 747,141

[22] Filed: Jun. 20, 1985

[30] Foreign Application Priority Data

Jun. 21, 1984 [FR] France ............... 84 09736

[51] Int. Cl.[4] ............................... C03B 19/10
[52] U.S. Cl. ........................... 65/21.4; 65/22; 65/32; 65/142; 501/33
[58] Field of Search .............. 501/33; 65/21.4, 22, 65/32, 142

[56] References Cited

U.S. PATENT DOCUMENTS

| 2,911,669 | 10/1959 | Beckwith | 65/21.4 |
| 3,365,315 | 1/1968 | Beck et al. | |
| 3,838,998 | 10/1974 | Matthews et al. | 65/21.4 |
| 4,017,290 | 4/1977 | Budrick et al. | 65/21.4 |
| 4,059,423 | 11/1977 | DeVes et al. | 65/21 |
| 4,391,646 | 7/1983 | Howell | 501/33 X |
| 4,475,936 | 10/1984 | Aston et al. | 65/21.4 X |

FOREIGN PATENT DOCUMENTS

| 2249585 | 5/1975 | France | |
| 2318123 | 2/1977 | France | |
| 2524610 | 11/1983 | France | |
| 960902 | 6/1964 | United Kingdom | 65/22 |

OTHER PUBLICATIONS

Chopinet et al., Factors Determining the Residual Sulfate Content of Glass; Glasstechniche Berichte, vol. 56, pp. 596–601 (1983).

Primary Examiner—Robert Lindsay
Attorney, Agent, or Firm—Pennie & Edmonds

[57] ABSTRACT

The invention relates to a process and apparatus for producing hollow glass microspheres. According to embodiments of the invention, particles of a soda-lime-silica glass containing slight amounts of sulfur compounds are suspended in a gaseous current and expanded in a burner, at a treatment temperature at least 100° C. above the working temperature at which the specific type of glass constituting the treated particles is made from its raw materials, such as sand, lime, sodium carbonate, sodium sulfate, and others, depending on the particular type of glass. The process makes it possible to increase the yield of the transformation of the particles.

34 Claims, 4 Drawing Figures

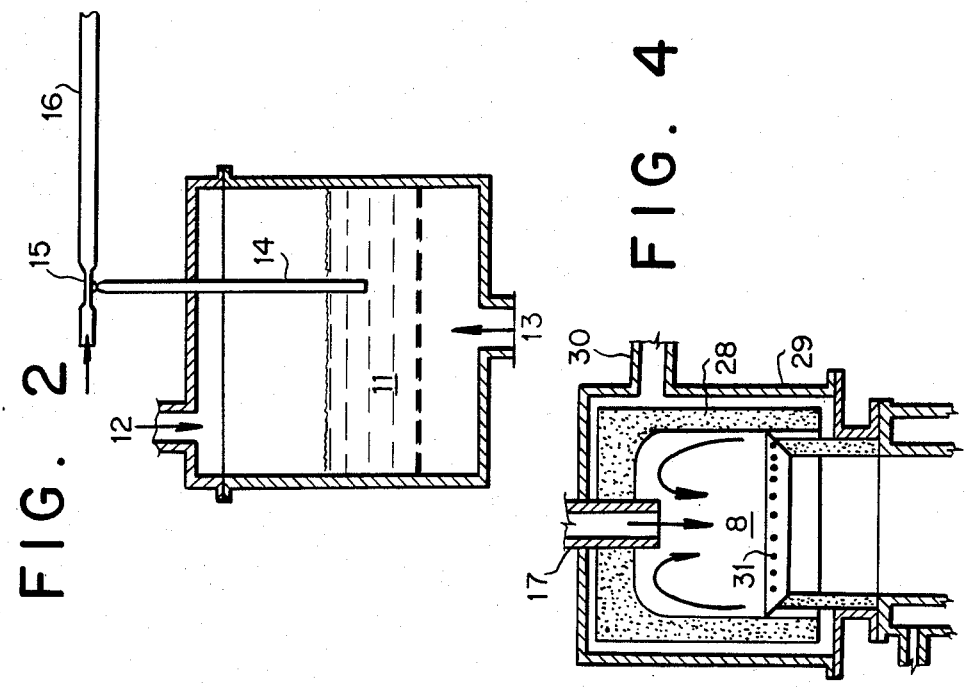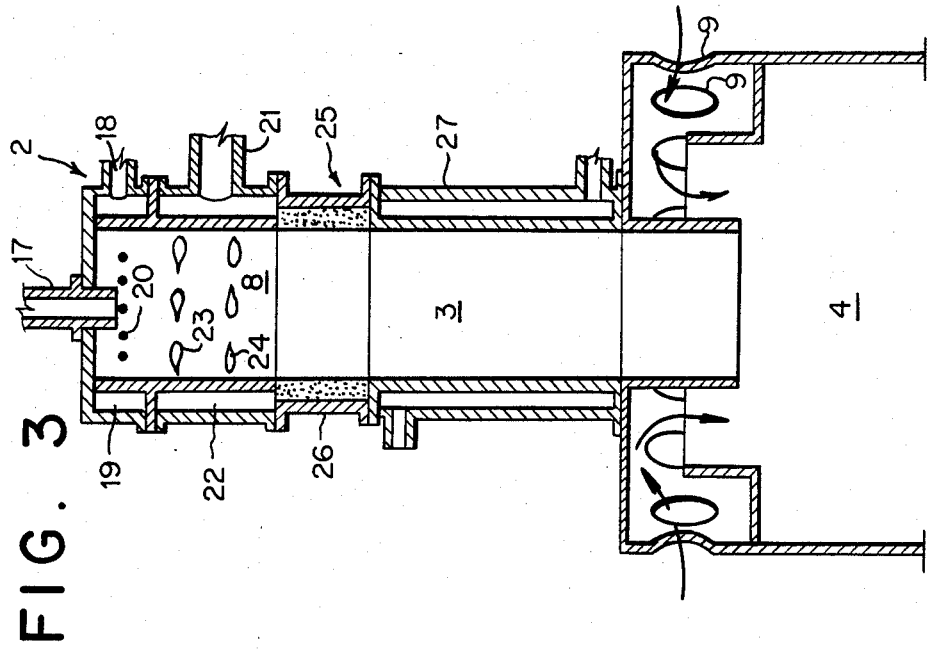

PROCESS FOR PRODUCING GLASS MICROSPHERES

BACKGROUND OF THE INVENTION

1. Field of the Invention

The invention relates to a process and apparatus for producing hollow glass microspheres, and more particularly to techniques in which fine solid particles of a suitable glass are expanded by a heat treatment.

2. Description of Related Art

A longstanding difficulty inherent in these techniques resides in obtaining a product exhibiting well-defined, very homogeneous properties, by a minimum of simple operations. In particular, although processes involving formation of microspheres by passing the particles through a burner has been attempted and has appeared to have certain advantages, this type of operation has not proved to be very satisfactory with respect to its yield and the quality of the products obtained. This is explained particularly by the difficulty of performing the treatment in a perfectly uniform way for all the particles. A considerable part of the mass of treated particles is not found to be in expanded form on coming from the treatment.

Quality products can be obtained under previously known conditions, but for this purpose it is ordinarily necessary to add to the heat expansion treatment very rigorous sorting operations which limit the yield and substantially increase production cost.

To improve the yield of the particle expansion process, a solution previously considered consists in extending the heat treatment time. But it is found that even if a larger proportion of the treated particles is expanded, this way of operating entails increased risks of the particles, which are thus kept in a viscous state, sticking to the walls of the apparatus in which they are produced, or even sticking to one another to form undesirable aggregates.

Another difficulty comes from the fact that the expanded particles, when held at a high temperature too long, can allow the expansion gas to diffuse, which leads to deflation, and thus to denser particles.

To minimize these difficulties, previously proposed solutions have tended to limit the treatment temperature, which consequently has imposed more rigorous limits in regard to the initial composition and the size of the particles that can be treated effectively.

OBJECTS AND SUMMARY OF THE INVENTION

Accordingly, an object of the invention is to provide a process for producing microspheres from glass particles, particularly containing low sulfur content, by a heat treatment process with improved yield.

Another object of the invention is to provide a technique having lower manufacturing costs.

Another object of the invention is to allow the use of a wider range of materials than before. Particularly, the invention has the object of allowing the treatment of glasses whose sulfur content is relatively low. Also, the invention has the object of allowing the treatment of particles whose sizes may be smaller than the particles previously treated.

Another object of the invention is to fix the conditions under which the expansion of particles takes place, in order to produce products whose properties are better controlled.

According to one aspect of the invention, a process for producing hollow microspheres, such as microspheres of a soda-lime-silica glass with low sulfur content, comprises treating the particles at a temperature at least about 100° C. above the working temperature at which said glass was manufactured. According to further aspects, the particles are suspended in a gaseous current and passed thereby through a burner for treatment. It is desirable to treat the particles at about 1500°–1700° C., maintaining them at such temperature for less than about 0.1 second, and then cool the particles suddenly to below about 1000° C., or preferably to below about 750° C. The burner is advantageously operated such that the air factor, that is, the ratio of the amount of air introduced into the burner to the amount necessary to produce stoichiometric combustion, is between about 0.75 and 1.1, or preferably 0.8–0.95. The particles advantageously are passed first through a reducing atmosphere and then through a non-reducing atmosphere, e.g., neutral or slightly oxidizing.

Improved microspheres of the type produced by these processes are also considered to be features of the present invention.

According to further aspects of the invention, apparatus for producing hollow microspheres comprises burner means, means for introducing glass particles into the burner means for movement therein in a predetermined direction, and means for introducing combustion gases into the burner means for movement therein in the same predetermined direction and for producing combustion. Advantageously, the particles are suspended in a gaseous current, and the combustion reaches substantially at least 1500° C. Also provided are tempering means for receiving the particles and gases and for cooling them by admitting ambient air, separating means for separating the particles from the gases, and suction means for drawing ambient air, particles, and gases through the tempering means and separating means.

Other objects, features, and advantages of the invention will be seen in the following detailed description of processes, products, and apparatus, with reference to the accompanying drawings.

BRIEF DESCRIPTION OF THE DRAWINGS

FIG. 2 shows, in section, a device for putting particles into suspension before their injection into a burner for expansion, FIG. 3 is a view, in section, of part of the apparatus in which expansion is performed, including a burner, and FIG. 4 is a partial sectional view similar to FIG. 3, showing the operation of another type of burner.

DETAILED DESCRIPTION

Description of the Process

Figure 1:
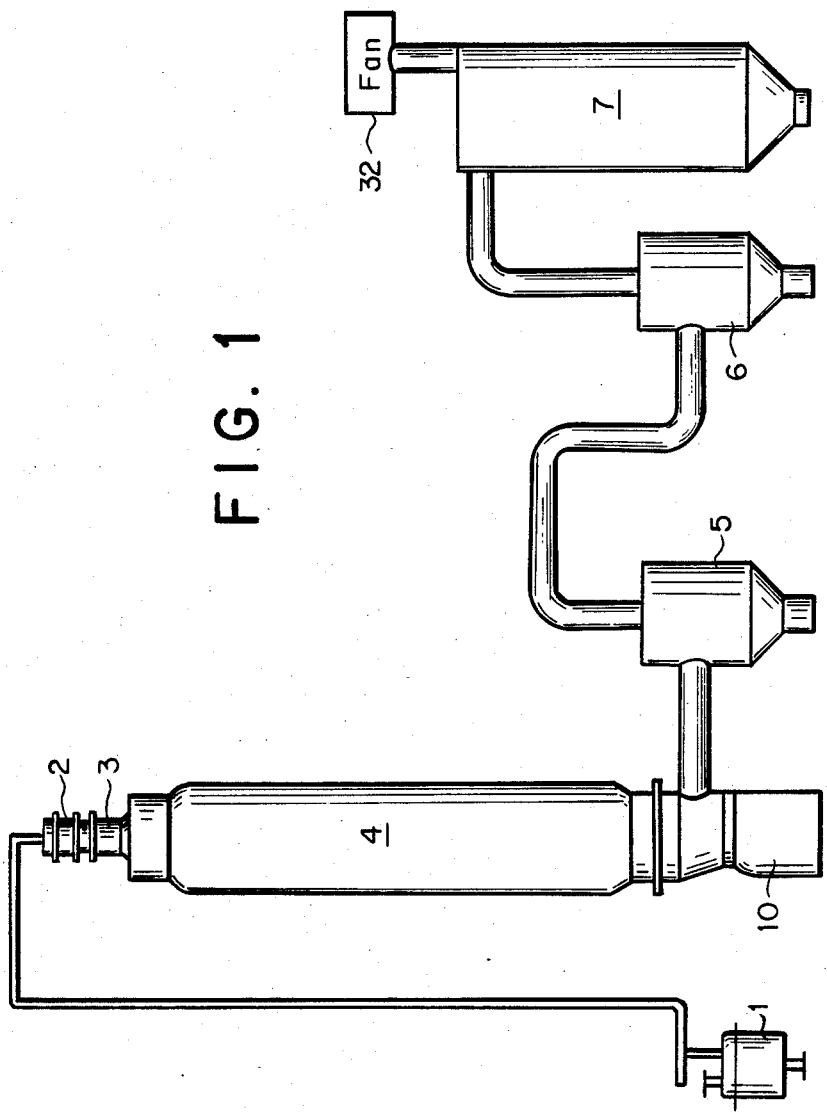
FIG. 1 is a diagrammatic view of apparatus for producing microspheres by expansion according to an embodiment of the invention.

It has been discovered, contrary to what was previously believed, that it is advantageous to perform the expansion of particles at higher temperatures than in prior processes. The prior art teaches that it is necessary to perform the expansion at a temperature well below that used during melting of the raw materials to obtain the vitreous mass from which the particles are made. For the most common soda-lime-silica glasses—for example, those used to produce flat glass, or those used in bottle production—the traditional temperatures for making glass from traditional materials, particularly including sand, lime, sodium carbonate, and sodium sulfate, are between about 1250° and 1480° C. For these glasses the prior art proposes an expansion heat treatment that is between 1050° and 1380° C., depending on the specific type of glass. The expansion temperature is therefore about 100° to 300° C. below the glass formation temperature.

On the contrary, according to aspects of the invention, the treatment temperature is substantially greater than the melting temperature of the raw materials. For the same type of soda-lime-silica glass the expansion according to the invention is performed at a temperature above 1500° C., and preferably above 1550° C., and in any event approximately at least 100° C. above the glass working temperature. Reasons of a technological nature ordinarily limit the treatment temperatures. It is very difficult, for this type of operation and under economical conditions, to reach temperatures above 1750° C. Preferably the treatment temperature according to the invention is between 1550° and 1700° C.

Under the conditions of the invention, the treatment temperature can be maintained for an extremely short time. Depending on the size of the particles used, a treatment period of a few thousandths of a second is generally sufficient to obtain a good yield. Prolonging the treatment generally proves ineffective to increase the yield.

Advantageously the holding time at the highest temperatures is not more than 0.1 second and preferably is less than 0.05 second. This treatment time can be as short as 0.01 second or less.

In particular, depending on the average granulometry of the initial particles, the treatment time can be very short. Granulometry is measured by passing the particles through a sieve of predetermined dimensions. For particles less than 20 micrometers, the treatment time will advantageously not be greater than 0.02 second.

The temperature of the microspheres is then quickly brought below that corresponding to softening of the material, by an intense mixing with cold air. To solidify the formed spheres, the temperature should be brought to below 1000° C. and preferably to below 750° C. These temperatures are reached practically immediately by introducing a sufficient amount of air at ambient temperature into the reactor. The amount of air to solidify the microspheres is limited only by considerations of a practical nature. To obtain a good tempering of the microspheres, the volume of ambient air is at least equal to twice that of the treatment gases carrying the spheres. A volume of ambient air greater than three or four times that of the hot gases, even if it might be expected to result in a more effective tempering, runs into difficulties in regard to complete, fast mixing with the treatment gases.

Contrary to what the prior art would lead one to believe, the present inventors have found that the nature of the atmosphere in which the treatment takes place is a very sensitive factor in the expansion of particles containing sulfur compounds.

The thermal decomposition that is usually contemplated changes the sulfur compounds into sulfur trioxide, which is partially decomposed into sulfur dioxide according to the formula:

$$SO_4^{2-} \rightleftharpoons SO_3 + O^{2-}$$

$$SO_3 \rightleftharpoons SO_2 + \tfrac{1}{2}O_2$$

Sulfates are present in numerous industrial glasses. Their contents vary to a considerable extent. In glasses used for glazing, which constitutes a particularly important industrial application, sulfates, by their capacity to decompose, play an important role in fining during working of the vitreous mass. Release of $SO_3$ bubbles is an effective means for carrying particles or occluded gas from the molten mass. In these glasses, the residual sulfate content is, of course, smaller the longer and more intense the fining. We shall see below that this phenomenon has certain consequences in regard to the invention.

The inventors have found that in a reducing atmosphere and particularly in an atmosphere containing hydrogen, and preferably nascent hydrogen, oxidation-reduction phenomena intervene in the process of formation of microspheres.

An assumed mechanism comprises, as above, thermal decomposition followed by reduction of sulfur trioxide according to the following formula:

$$SO_4^{2-} \rightleftharpoons SO_3 + O^{2-}$$

$$SO_3 + H_2 \rightleftharpoons SO_2 + H_2O$$

Actually, a more thorough study has shown that the reduction is performed directly on the sulfate without going through the intermediate gaseous phase. The reaction would then be of the type:

$$SO_4^{2-} + H_2 \rightleftharpoons SO_2 + H_2O + O^{2-}$$

Regardless of the exact mechanism, the reduction into sulfur dioxide should be advantageous for the expansion of the particles for several reasons.

A first reason is linked to the nature of the gas used for the expansion. Actually, at high temperature the sulfur trioxide is redissolved in the molten glass, and a part of the microspheres undergoes a collapse before being solidified. Sulfur trioxide is no longer detected in the occluded gas in the presence of a chemical reduction. Thus the expansion gas is primarily sulfur dioxide. In contrast with sulfur trioxide, sulfur dioxide is practically insoluble in glass. The sphere therefore remains stable provided it is cooled before the risk of sticking arises.

Experimentation also shows that desolubilizing of the oxide is more intense in a reducing medium. Independently of the transformations performed on the sulfur compounds, expansion of the particles is further promoted.

Another reason explaining the advantages of a reaction comprising a reduction is the rapidity with which it is performed. This seems to be linked to the fact that the diffusion of hydrogen (and particularly nascent hydrogen) in the entire particle is extremely fast. Thus, to some extent, the speed of treatment may be less sensitive to the size of the particles.

Further, the rapidity has the advantage of allowing a treatment at relatively higher temperature and for a shorter period, these two conditions resulting in a more energetic heat treatment favoring expansion of the microspheres and, on the other hand, limiting the chance of sticking.

The intensity of the reduction is somewhat dependent on temperature. Reducing conditions normally result from the mode of operation of the burner and from the ratio of the amount of fuel to the total amount of gases used to produce the combustion. The ratio in question results in a reducing atmosphere when the fuel gas is in excess. Thus, there do not exist the stoichiometric conditions which would make it possible to achieve the highest flame temperatures. Moreover, in the combustion gases, the balances that are established are dependent on temperature conditions; formation of reducing agents and particularly of hydrogen is more intense the higher the temperature. For these reasons particularly, the temperature and oxidation-reduction conditions should preferably be fixed jointly.

It should also be pointed out that cracking of the fuel gases, for example methane, is more intense at the very surface of the particles. The particles certainly act as a combustion initiator, and the atmosphere surrounding these particles is considerably different from that corresponding to the entire gaseous mass used and which is analyzed at the outlet of the treatment device.

Another advantage of the reduction treatment mode according to the invention is to facilitate the expansion itself, when the initial level of the expansion agent, i.e., the content of sulfur compound in the glass, is relatively slight. Indeed, a better utilization of this expansion agent is noted. Analysis of the glass of spheres produced in a reducing atmosphere shows a lesser residual sulfur content than that of spheres produced in an oxidizing atmosphere. This makes it possible, if necessary, to use various sources to produce the particles which are expanded and particularly cullets poor in sulfur compounds, such as cullets coming from glasses that have undergone thorough fining.

The slight sulfur content of well fined glasses has as a result a better homogeneity of the glass itself, which makes it possible, other things being equal, to improve the expansion yield and to obtain microspheres exhibiting particularly remarkable mechanical qualities. Use of the process according to the invention with these very fined glasses therefore is advantageous.

It will also be understood that by controlling a factor that is independent or partially independent of temperature, substantially increased means are available to direct the operation so as to produce microspheres exhibiting better defined characteristics. In particular, it is possible by this means to promote the formation of microspheres of predetermined density.

We have seen that the reducing character of the atmosphere surrounding the spheres during formation is a favorable factor in using the invention. Creation of this atmosphere at high temperature is advantageously obtained by operating in a burner whose flame is maintained with a mixture whose fuel/oxidizer ratio is greater than that corresponding to stoichiometric conditions.

The reducing character of the gaseous mixture of the burner in which the reaction is performed can be expressed according to the invention by the "air factor," i.e., the amount of air actually introduced into the burner in relation what would be necessary to have a neutral combustion. Experience shows that the treatment, particularly expansion yield, is very sensitive to variations in this factor. Advantageously, the air factor, for the temperatures considered, is not less than 0.75 and preferably is between 0.8 and 0.95.

It is difficult in practice to go below an air factor of 0.75. Below this factor, the resulting combustion leads to temperatures usually less than those required according to the invention. Moreover, too great a reduction of the air factor increases the treatment cost by requiring a much larger fuel consumption for the same release of energy.

The reducing character of the treatment atmosphere can be defined by the content of the reducing gases present, and particularly of hydrogen, this gas, as the studies of the inventors showed, being the most probable reducing agent, particularly considering its rapidity in diffusing in the molten glass.

Given that it seems advantageous for the expansion reaction to have an atmosphere exhibiting a certain hydrogen level, it seems that this content should remain limited. Treatment in an atmosphere with an excessively reducing character could modify the structural qualities of the glass forming the microspheres.

The reducing treatment leading to the expansion of microspheres therefore is preferably limited to conditions that do not substantially modify their properties.

Experimentally, for production of the microspheres whose characteristics are presented below, a hydrogen level less than 4% in the treatment gases makes it possible to achieve a good expansion yield without modifying the quality of the resulting microspheres. Preferably this level is below 3%.

As we have indicated above, this hydrogen level is an overall level measured from all the combustion gases. This level is only indicative of the reducing character of the atmosphere immediately surrounding the particles, to the extent that the particles act as "catalysts" on which additional hydrogen is formed.

The reducing character of the combustion also depends, to a certain extent, on the nature of the fuel gas chosen. It can be advantageous to choose a gas whose cracking is relatively intense under the conditions of the invention. Thus the use of propane as the combustion gas may be preferred to that of methane to the extent that the former leads to a more abundant release of hydrogen.

It should also be pointed out that it is feasible for the reducing character to be developed only during a part of the treatment. Considering the mechanisms brought into play, it may be advantageous to limit the reduction effect to the beginning of the treatment. In this initial phase, transformation of the sulfur compounds to sulfur dioxide insoluble in glass is performed. When this transformation has been performed, the surrounding atmosphere can, of course, return to being neutral or even slightly oxidizing for the end of the treatment.

As we have said, the treatment is ordinarily performed in the flame of a burner. The sequence of reducing and neutral or even slightly oxidizing stages is obtained, for example, by causing the particles to advance through the flame from a zone initially rich in fuel gas into zones where the mixture becomes stoichiometric or even slightly richer in air. Under these conditions, even if the gaseous mixture coming from the burner is slightly oxidizing overall, the treatment initially benefits from the advantages linked to the reducing conditions. Of course, the sequence of these stages actually occurs in the process of development of microspheres only because of the extreme rapidity of the phenomena brought into play, particularly the diffusion of hydrogen in the glass particles.

In case the gaseous mixture is oxidizing overall, this character is necessarily limited; otherwise it would be difficult to have an effective zone exhibiting a reducing character in the flame. It would also be difficult to achieve suitable temperatures. Experimentally, it is found that the air factor should not exceed 1.1 and preferably should stay below 1.05.

The weight composition of glasses most widely used for traditional applications, for the main elements, is of the following type:

| | |
|---|---|
| $SiO_2$ | 55–80% |
| $Na_2O + K_2O + Li_2O$ | 8–18% |
| $CaO + MgO + BaO + ZnO$ | 4–14% |
| $Al_2O_3$ | 0–5% |
| $B_2O_3$ | 1–10% |
| F | 0–5% |

Other conventional types of glass may contain 0–15% by weight of $B_2O_3$ in combination with the above constituents.

To these traditional elements should also be added those that usually appear as more or less abundant impurities: $Fe_2O_3$, $P_2O_5$, $Cr_2O_3$, etc., which normally do not exceed 10% by weight of the whole.

Oxidized sulfur compounds are also present in these glasses. Their content can vary widely. Generally, the sulfur content of the glasses does not exceed 0.5% by weight of the particles before their expansion, but much slighter contents suffice to assure an expansion leading to microspheres with a density as low as 0.1 g/cm$^3$.

Even if, other conditions being equal, the initial sulfur content can affect the degree of expansion achieved, it generally constitutes a limit only for the production of greatly expanded microspheres. This is the case, for example, when working initially with particles containing only very slight amounts of sulfur, for example, less than 0.01%.

For such sulfur contents, and even for contents that are still slighter, expansion remains possible under the conditions of the invention, but the microspheres thus produced generally exhibit a much higher density. Far from being a disadvantage, this latter characteristic may be desired. This is the case particularly when the microspheres are intended for uses for which a very high resistance to hydrostatic pressure is necessary. In fact, a very clear correlation is found between the density of the microspheres and this resistance to pressure. The higher the density, the greater the resistance.

The possibility according to the invention of expanding glass particles with a slight sulfur content is a certain advantage. Thus, it is possible to use such raw materials as cullets coming from float glass production, whose sulfur content is always very low, as a result of the extended fining and high temperature to which this type of glass is subjected. Ordinarily, the sulfur content is less than 0.1%. Even these glasses have led to good results by treating them by the process according to the invention.

In comparison with prior techniques, the technique according to the invention makes it possible either to achieve a greater expansion or to expand glasses which previously were considered as unsuitable for this purpose.

Similar considerations can be made in regard to the size of the particles treated. Preferably the glass particles used to produce microspheres have a maximum size of about 100 micrometers. Although coarser particles could be expanded, their treatment is usually made more delicate because, since they are bulkier, the treatment time is necessarily longer which is not desirable as we indicated above. Traditionally, very fine particles are also ruled out because it is difficult to obtain their expansion. These are particles less than 10 micrometers, or at least less than 5 micrometers.

Advantageously it has been found that a large proportion of these very small particles, less than 20 micrometers and down to 5 micrometers or even less, undergo an expansion resulting in satisfactory microspheres in usable proportions. The reasons for this result are not perfectly known, but may be related to the rapidity of treatment and the high temperature which make it possible to develop the expansion while limiting the loss of the expansion agent. In fact, a considerable modification of the composition of the whole is noted during the heat treatment of the particles. In particular, the sulfur content of the microspheres is considerably less than that of the particles, even taking into account the gas content trapped in the sphere. In other words, during heat treatment a considerable fraction of the sulfur is eliminated. This fraction can reach and exceed 30% of the sulfur initially present.

Various reasons can cause the sulfur to be evacuated more slowly from coarser particles, particularly the fact that the particles exhibit a surface/mass ratio that is smaller, the coarser the particles. Exchange losses with the atmosphere which are a function of the exposed surface are relatively less.

Another reason comes from the fact that probably for the coarser particles, for which the treatment is comparatively longer, a surface layer is formed whose characteristics are different from those of the inside mass. This layer would tend to oppose further exchanges between the inside of the particle and the adjacent atmosphere. The expansion agent would remain trapped in this surface layer.

When, according to the invention, the treatment (combined with reduction) is very rapid, it may be that the released gas does not have time to escape even from small particles before they are again solidified. A greater proportion of the particles would thus be expanded. Whatever the actual reasons may be, this considerable increase of the fraction of small-sized particles that are transformed into microspheres is a very favorable aspect of the process according to the invention.

By operating according to the invention, microspheres are obtained that can exhibit a great variety of sizes, densities, and glass compositions. The starting conditions are, of course, of prime importance. Thus, the initial granulometry determines, to a considerable extent, the final size, even if the nature of the glass and the treatment also play important roles.

A feature of the processes according to the invention, as we have indicated, is to make possible the production of microspheres from smaller particles, the microspheres produced themselves being smaller. With the treatments according to the invention it is possible to produce, with a satisfactory yield, microspheres whose average diameters are on the order of 5 micrometers, particularly with higher densities.

For most current uses, the microspheres produced exhibit diameters between 20 and 100 micrometers. The coarsest microspheres produced ordinarily do not exceed 200 micrometers.

The density of the microspheres produced is between 0.1 and 1.2 g/cm$^3$. Microspheres with density up to about 2.2 g/cm$^3$ are also valuable and are also produced according to the present invention. The density can be controlled to a certain extent by selecting the sulfur content of the particles, their sizes, and the characteristics of the treatment itself.

In a simplified way, the density is lowered to the extent that the amount of sulfur and the temperature at which the treatment is performed are elevated.

To obtain a product with a great regularity of properties, it goes without saying that it is preferable to use particles whose grain size is quite homogeneous. In this case, with each particle undergoing approximately the same treatment, the resulting microspheres also exhibit a great homogeneity. It is then also possible to control the conditions better to achieve the desired sizes and densities. Further, since the treatment can be tailored to the fraction treated, it is possible to achieve very high expansion yields.

Besides the size of the particles, experience shows that it is advantageous if they exhibit as spherical a shape as possible. Shaping of such particles can be promoted during grinding. A grinding technique in a fluidized bed or air jets is advantageously used for this purpose.

Even when a fraction of relatively inhomogeneous particles is treated according to the invention, considerable yields can be achieved. The most significant measure of yield is the percentage of the particles that undergo expansion. Altogether, the percentage of expanded particles, determined by flotation, is most often greater than 50% and is ordinarily in the neighborhood of 55% and more. For fractions that have been subjected to a more rigorous initial sorting by size, the percentage can reach and even exceed 65%.

The literature often refers to the "volume percentage", which is the ratio of the volume of the expanded material to the volume of all the material after treatment. This value is not very significant since it depends on the rate of expansion or what is the equivalent of the mean density of all the material after treatment. Under the conditions of the invention, if the volume of the expanded particles is considered in relation to the volume of the total material after treatment, the yield ordinarily exceeds 90% and can even exceed 95%.

Another advantageous characteristic of the techniques according to the invention, which is related to both the high temperature and the reducing action established during at least part of the treatment, is the slight energy consumption to produce these microspheres. This consumption varies as a function of numerous parameters but is established on an average at values on the order of about 10,000 kilocalories per kg of treated particles or less.

The increase in the treatment temperature should be reflected, of course, by an increase in energy consumption. Actually, this increase is very slight or nonexistent under the conditions of the invention. But above all this consumption is particularly slight when compared with the expanded product and no longer with the initial product, considering the high rate of expansion.

The following non-limiting examples illustrate various aspects of the invention:

EXAMPLE 1

In a first series of tests, a composition of 900 kg of glass was prepared in a pot at a melting temperature of 1250° C. The melting period was 18 hours. The molten materials were the following:

| | |
|---|---|
| sand | 494.5 kg |

| -continued | |
|---|---|
| fluorspar | 27 kg |
| feldspar | 5.8 kg |
| hydrated borax | 157.2 kg |
| dolomite | 11.3 kg |
| CaCO$_3$ | 47.8 kg |
| ZnO | 19.4 kg |
| sodium carbonate | 124 kg |
| sodium sulfate | 12.7 kg |
| Fe$_2$O$_3$ | 0.3 kg |
| | 900.00 kg |

The mass was melted in an oxidizing atmosphere. After being cast and cooled, the glass was broken into fragments of some centimeters, and then into particles of some millimeters in a second mill.

A last grinding in a ball mill resulted in a powder with a grain size less than 100 micrometers.

Sorting on a dynamic selector made it possible to isolate a still relatively large proportion of the particles whose sizes, for this test, were between 7 and 50 micrometers and corresponded to 80% by weight of the particles leaving this last mill. Gravimetric analysis of the composition of the particles was the following:

| | |
|---|---|
| SiO$_2$ | 67.75% |
| S expressed in SO$_3$ | 0.85% |
| Fe expressed in Fe$_2$O$_3$ | 0.10% |
| Al$_2$O$_3$ | 0.30% |
| CaO | 7.75% |
| MgO | 0.75% |
| Na$_2$O | 13.20% |
| B$_2$O$_3$ | 6.50% |
| ZnO | 1.60% |
| F | 0.85% |
| Various | 0.35% |

The oxidized character of the composition was analyzed by measuring the ratio $(Fe^{3+}/Fe^{2+})^2$ according to the method developed by J. L. BARTON, J. J. MASSOL and M. H. CHOPINET (XIII International Glass Conference, Hamburg, 1983—Glasstechnische Berichte [Glass technical report] 56, 1983). In the case of this preparation, the ratio was greater than 280.

The particles were put in suspension in an air current at a rate of 6 kg of particles per hour at an air flow of 4.6 m$^3$/h. The rate of injection in the burner in axial position at the bottom of the burner was 20 m/s.

The cylindrical burner of the type described in the publication of French Patent FR-A No. 2 249 585 was fed Lacq gas (methane) and air. The air injections were made tangentially. The gas was introduced first. The air was injected on the walls of the combustion chamber at two levels in the direction of advance of the gases. The air feed orifices were directed so that the direction of rotation of the gases, for the two levels, were opposite to one another. This arrangement, while setting up an intense mixing, avoided imparting to the unit a rotation movement that would tend to throw the particles onto the walls of the burner.

A cylindrical chamber 100 mm long extended from the burner part in which the feed took place. In this chamber the temperature reached its maximum. Extending immediately from the chamber was a tempering chamber at the top of which the ambient air penetrated.

This entire device was mounted vertically, the burner and injection of particles being located above, so that circulation was downward.

Separation devices, cyclones, filters and optionally sorters followed to recover the expanded particles and separate the unexpanded particles.

The temperatures were measured by thermocouples. The CO, $CO_2$ and $O_2$ contents in the gases emitted by the burner were also measured.

An effort was made to show the influence of temperature on the expansion of particles by keeping the other conditions as identical as possible. The difficulty arose from the fact that for the same device the temperature variations are ordinarily obtained by changing the operating conditions of gases feeding the burner which can have a direct effect, for example, on the oxidation-reduction character, energy consumption, etc. The inventors, however, were able to obtain a certain number of significant results.

Two comparisons were made. One was for clearly reducing conditions, and the other was for conditions that generally were slightly oxidizing, which did not, as we saw it, prevent the passage through transient reducing conditions during passage through the flame.

In all the tests, the particles introduced had the same granulometry. It was a mixture wherein the sizes for 80% by weight of the particles were between 7 and 50 micrometers.

Feed was at a rate of 6 kg/h of particles in the burner adjusted for these tests at 125,000 kilocalories/hour.

The yield is expressed in percentage by weight of expanded particles in relation to the total mass recovered. The expanded particles were sorted by flotation.

| Test no. | $n_a$ (air factor) | Temp. °C. | Total yield % |
|---|---|---|---|
| 1 | 0.91 | 1645 | 55 |
| 2 | 0.91 | 1600 | 48 |
| 3 | 1.10 | 1600 | 43.4 |
| 4 | 1.11 | 1565 | 36.5 |

A substantial difference was found for the two types of oxidation-reduction conditions in the yield of microspheres formed when the temperature was increased about fifty degrees.

It should be indicated that the measurements of yield are relatively inexact. The margin of error should be around 2 to 3%. This lack of precision should be taken into account in evaluating the results. In particular, the apparent difference between the two air factor values (oxidation-reduction conditions) undoubtedly appears to be greater than it really is.

Be that as it may, these figures unequivocally show the effect of temperature on the microsphere yield.

EXAMPLE 2

In another series of tests, the inventors studied the effect of variations in the oxidation-reduction conditions in the combustion gas on the microsphere yield. Under conditions as close as possible to Example 1 for the other factors, the proportions of air and fuel were made to vary in the burner.

The initial particles were the same as those used in Example 1. The grain size and feed delivery were also identical and the burn operated at 125,000 kilocalories/hour.

The results are given in the following table:

| Test no. | $n_a$ (air factor) | Temp. °C. | Total yield % |
|---|---|---|---|
| 5 | 0.82 | 1575 | 49.6 |

-continued

| Test no. | $n_a$ (air factor) | Temp. °C. | Total yield % |
|---|---|---|---|
| 1 | 0.91 | 1645 | 55 |
| 6 | 1.05 | 1595 | 44.5 |
| 4 | 1.11 | 1565 | 36.5 |

Thus, the values found by causing the air factor to vary showed a higher yield for substantially reducing conditions. It is difficult to size up with great precision the improvement obtained and especially to evaluate the meaning of the maximum yield of 55% found for the air factor of 0.91, on the one hand, considering the fact that the temperatures were not identical—we have seen that the temperature affects the yield—and, on the other hand, because of the lack of precision in the measurements of yield. In any case, in practice, for obvious reasons of energy consumption and to obtain temperatures corresponding to those defined according to the invention, it is not possible to use the burner under conditions very unbalanced in the direction of reduction. But it is significant to establish the effect of these reducing conditions on yield.

Independently of the effect on production, the inventors established the importance of oxidation-reduction phenomena in the formation of microspheres by analyzing, for example, the content of gases occluded in these microspheres, i.e., the free gases which fill the interior of the microspheres. In particular, the oxygen content varied very notably. Considerable amounts of oxygen were detected in a neutral or oxidizing atmosphere and clearly lesser amounts in a reducing atmosphere.

Thus, for example, for the microspheres produced in tests 2 and 3, the oxygen contents were respectively 3.7% and 9.3% by volume. This difference was due to the reduction by hydrogen created in the flame.

A higher gaseous $SO_2$ content under reducing conditions was also noted, which confirmed the reaction mechanism indicated above. For tests 2 and 3, this content was established respectively at 92.1% and 86% by volume. This difference is explained by the resolubilizing of $SO_3$ in the glass when operating in an oxidizing medium. On the other hand, in a reducing medium, all the gas formed by decomposition of the sulfur constituents of the glass during expansion was directly in the form of $SO_2$ which practically does not redissolve.

The reducing action of the atmosphere was also shown by analysis of the glass of the initial particles and that of the glass forming the microsphere walls. The more or less oxidized character can be determined by the ratio $(Fe^{3+})^2/(Fe^{2+})^2$ of the glass. For tests 2 and 3 under consideration, this ratio was 2.1 and 5.8 respectively.

It was noted in these two tests that the value was very much lower than that of the initial particles (280) which indeed reflects in all cases the presence of reducing mechanisms during this treatment.

EXAMPLE 3

All the tests reported above were made with particles whose granulometry was relatively spread out. Tests were made with particles of the same glass but whose selection was made over a narrower range. This fraction was such that 10% by weight of the particles exhibited a size less than 10 micrometers and 10% of these particles were over 30 micrometers.

Example 1, reproduced with this granulometry, the other parameters remaining unchanged, resulted in a yield of 64% by weight of expanded particles (more than 95% by volume).

EXAMPLE 4

Tests were made to show the existence of the various stages of the physical-chemical process followed by the particles subjected either to reducing or oxidizing conditions, or a combination of both types.

In a first test, the particles were introduced at the bottom of the burner and therefore went through the flame, i.e., the relatively reducing zone of the flame front, then the zone located downstream from this flame front and which was less reducing, or even neutral or oxidizing, depending on the value of the air factor.

In this first test, the treatment temperature was 1550° C. and the air factor was 1.1. Complete combustion was therefore oxidizing.

Analysis of the gaseous content of the microspheres made it possible to know with good certitude the mechanisms occurring during the transformation of the particles.

Under these conditions, the gaseous content of the microspheres introduced into the bottom of the burner showed an $SO_2$ content of 90.9% and an $O_2$ content of 5.8%.

The purely thermal reaction should normally lead to a mixture of $SO_2$ and $\frac{1}{2} O_2$ in equal proportions. Therefore, there apparently was a reducing effect during the treatment despite the fact that overall the gaseous mixture was oxidizing.

The other gases detected were $CO_2$ and $N_2$; steam was not measured since analysis was made by mass spectrography.

In a second test, the particles were introduced about ten centimeters downstream from the flame front. The gaseous mixture this time was slightly reducing (air factor 0.92).

Analysis this time showed 85.3% of $SO_2$ and 10.2% of $O_2$. The oxygen therefore was reduced despite overall reducing conditions. This result, which may seem paradoxical, actually establishes the importance of passage through the cracking zone consisting of the flame front, a zone in which the reducing conditions are most intense.

As a check, tests made by introducing particles systematically at the bottom of the burner and causing the air factor to vary showed a clear correlation between the more or less reducing character of the combustion mixture and the oxygen content in the microspheres, this latter being lower, the more reducing the mixture.

EXAMPLE 5

The same glass as in the previous tests was used, with small-sized particles being selected.

The fraction selected was between 8 and 15 micrometers.

The test was conducted under reducing conditions with an air factor $n_a=0.9$. The treatment temperature was 1600° C.

The yield by weight of expanded particles in relation to the treated material rose to 48% and the density of these particles was 0.3 g/cm$^3$ in the part selected by flotation.

Therefore, it was established that even for very small particles a good expansion yield can be achieved under the conditions of the invention.

A similar test over a range of particles of small size but nevertheless greater than the previous ones showed that a very good yield can be obtained. In this case, the fraction was 8 to 20 micrometers. The air factor was still $n_a=0.9$ and the temperature 1600° C.

The yield obtained was 59% and the density of the microspheres separated by flotation was 0.24 g/cm$^3$.

EXAMPLE 6

A glass with a slight sulfur content was used in this test. The glass was a float glass cullet whose composition by weight was the following:

| | |
|---|---|
| $SiO_2$ | 71.4% |
| $SO_3$ | 0.3% |
| $Fe_2O_3$ | 0.07% |
| $Al_2O_3$ | 0.4% |
| CaO | 9.6% |
| MgO | 4.0% |
| $Na_2O + K_2O$ | 14.1% |
| Various | 0.13% |

The particles used had sizes between 7 and 50 micrometers. The test was performed at 1600° C. and with an air factor of 0.9.

The yield, although less than previously, was still advantageous in practice. It was about 25% by weight. The density of the expanded particles was also high and close to 0.35 g/cm$^3$.

Description of the Apparatus

Contrary to what has been proposed in the literature, expansion of the particles by combustion gases is advantageously performed by causing the particles to circulate downward in the same direction as the combustion gases.

Prior systems in which the circulation took place upward were chosen for the following reason. Since expanded particles have less density, a dynamic sorting automatically takes place between the expanded particles and those that have not been expanded. Keeping the unexpanded particles under treatment conditions as they rise was supposed to allow an increase in the proportion of particles finally expanded.

Practice shows that this way of proceeding does not make it possible to obtain an improvement in yield, but rather the contrary. Upward circulation actually requires gas flows at relatively slow speed, since small-sized particles easily "float" in excessively strong currents. Consequently, since the gases are driven at a limited speed, the holding time of the particles under treatment conditions is relatively too long. Even if this protraction makes possible the expansion of some particles which, under other conditions, would resist treatment, it is offset by the collapse of a considerable part of the particles that were previously rapidly expanded for the reasons that we have already indicated. Further, the particles tend to form aggregates on the walls. Overall, this mode of upward treatment is not advantageous.

Consequently, according to aspects of the invention, the device in which expansion is performed, which is either a burner or an enclosure in direct communication with the burner, is fed so that the particles circulate downward, in the same direction as the flow of the combustion gases.

In the form shown in FIG. 1, the device for producing microspheres comprises the following elements: a suspension device 1 for putting the particles in suspension in a gas current and carrying them to the combustion chamber 8 of a burner 2, the burner 2, an extension chamber 3 in which the combustion is continued, and a tempering enclosure 4. This part of the installation, in which the treatment resulting in the expansion of the microspheres takes place, is followed by a series of elements whose role is to separate the formed spheres from the gases that entrain them, on the one hand, and, on the other hand, from dust, unexpanded particles, or aggregates of particles stuck to one another. In FIG. 1 the combination of microsphere recovery elements comprises a preselector 10, two cyclones 5 and 6 and a bag filter 7.

Since feeding of the particles must be performed evenly and continuously in a gaseous reaction medium, a preferred mode consists in entraining the particles with a gas current. The particles are put in suspension in a gas current in a conventional way, such as from a fluidized bed of particles, by means of the suspension device shown in FIG. 2. In FIG. 2, fluidized bed 11 is fed particles through orifice 12 arranged in its upper part. Air is blown in under the bed of particles, entering by an orifice 13 in the lower part of the device 1, and is evacuated by the orifice 12. One end of a pipe 14 is immersed in fluidized bed 11. The other end of this pipe is connected to a venturi tube 15 in which the vector gas circulates at high speed. The partial vacuum created by venturi 15 draws in the particles which are sent by a conduit 16 toward the burner.

The flow and speed of the gases carrying the particles are selected so that the entrained particles do not settle during their travel to the reaction chamber. Further, when in a preferred manner the feed of air and fuel gas is performed through the bottom of the burner, the speed and flow of the gas carrying the particles should be kept within limits that do not disturb the proper operation of the burner.

In practice, the flow of the gas used, most often air, is much greater than the flow of gas necessary for simple pneumatic transportation of the particles. Still, this amount normally stays well below that which is used for operating the burner. However, this addition of air should be taken into account in setting up the conditions for feeding the burner. The gas transporting the particles is preferably air or a mixture of air and fuel gas, thus at least partially feeding the burner in which the expansion is performed.

Introduction of the particles into the burner is preferably arranged in such a way that in their advance the particles are brought through the flame front. Further, introduction is performed in such a way as to keep the particles from being projected onto the walls of the burner, particularly after they have been brought to a temperature corresponding to their softening point. Preferably, introduction of the particles is performed in the direction corresponding to the axis of the burner.

The burner selected for expansion of the particles should first of all make it possible to reach the required temperatures which, as discussed above, are preferably above 1550° C. The amount of heat released by the burner should also make it possible to maintain these temperatures at the particle flows contemplated. Internal burners in which the flame "clings" to a grid or bars do not provide satisfactory results. At the contemplated operating conditions, acoustic resonances are noted which are very prejudicial to the proper operation of the device.

To obtain a good flame stability at high temperature and over a sufficiently broad range of operating conditions, it is advantageous, according to the invention, to use a burner in which the flame is stabilized, for example, in contact with walls—such as those of the type described in the French patent application published under No. 2 524 610—or by a particular arrangement of the gas intakes into the combustion chamber as, for example, in the burners described in the published French patent application No. 2 249 585. It is possible, as the two prior cited publications show, to use a premixture or direct mixture in the combustion chamber. To increase the operating temperature, it is also possible to preheat the gases taken into the combustion chamber of the burner. It is also possible to use a more energetic gas mixture; for example, a mixture enriched with oxygen. This latter solution is not desirable as a general rule, to the extent that it entails an increase in production costs.

Preferably also the burner that is used should be able to set up zones in which the gas mixture is reducing. Such an arrangement is obtained in particular when the air necessary for combustion (or the oxidizing mixture used) is introduced on at least two levels along the path of the advance of the gases in the combustion chamber, at least one of these levels being located downstream from the introduction of the fuel gas. Under these conditions, the first combustion that occurs is necessarily reducing because of lack of oxygen.

The length of the combustion chamber 8 of burner 2 and of extension chamber 3 is a function of the holding time necessary for effective treatment of the particles. Although the circulation speed is great (on the order of 25 m/s), since the treatment is very rapid, the length of this part where the heat treatment is performed is relatively limited. By way of example, the total length of the combustion zone is advantageously between 6 and 50 cm, and preferably between 10 and 25 cm. This part of the device, in which the highest temperature prevails, is delimited downstream by the zone in which massive introduction of air at ambient temperature is performed to assure tempering of the formed microspheres.

As we have seen, the shortness of the holding time in the heat treatment zone avoids the dangers of collapse and of aggregation of the particles or sticking to the walls. To reduce further the dangers of sticking to the walls of extension chamber 3, the walls are advantageously subjected to intense cooling by keeping their temperature below that at which the glass remains soft and therefore sticky. Cooling of the walls of extension chamber 3 is obtained, for example, by a jacket in which water or air circulation is provided.

In comparison with prior techniques, the combustion chamber used according to the disclosed embodiment of the invention exhibits several advantageous characteristics for using these processes. Thus, preferably the entire cross-section of the chamber is effectively the site of combustion. In other words, since the flame occupies the entire cross-section, the particles that go into the chamber must necessarily go through the flame and therefore go through the various oxidation-reduction stages that have been set up. Confinement of the reaction to a combustion chamber with a relatively limited cross-section guarantees the maintenance of a high temperature and a very brief holding time, conditions that are particularly desired for the invention.

Further, the cross-section of the combustion chamber is fairly constant over the entire length corresponding to the zone for expansion of the particles, i.e., in the part that precedes the introduction of tempering air.

An example of a combustion chamber 8 for use with embodiments of the invention is shown in FIG. 3. The particles and the gas that transports them are introduced by pipe 17 on the axis of the device. The cylindrically shaped burner comprises a gas feed 18. The gas is sent from annular chamber 19 by orifices 20 into the combustion zone. The air is brought by pipe 21 into an annular chamber 22 and goes into the combustion zone by two series of orifices 23 and 24. These latter are directed so as to impart movements of rotation in opposite directions to the introduced air.

In the embodiment shown in FIG. 4, the burner of the type described in French patent application No. 2 524 610 consists of a chamber with refractory walls 28. Like the embodiment shown in FIG. 3, intake of the particles is performed at the top of the chamber by pipe 17. A double jacket 29 surrounds the combustion chamber. The fuel mixture brought by pipe 30 circulates in this jacket. The mixture is heated during its passage in the double jacket along the outside walls of the chamber. It is introduced into the chamber by orifices 31 hollowed out in the refractory base. The position of orifices 31 is selected so that intake of the mixture is performed countercurrent to the circulation of the combustion gases and along the refractory walls. This arrangement is particularly advantageous for reaching high temperatures and a great operating stability.

The two preceding burners can be used with equipment which otherwise can be identical.

FIG. 3 shows the part of this equipment immediately following the burner. The combustion chamber 8 is extended by a coupling element 25 comprising a refractory wall enclosed in a metal jacket. Further in the extension of the chamber 8, an extension chamber 3, where further combustion takes place, is delimited by a double metal wall 27 in which cooling water circulates.

It is found that, by maintaining the temperature of this wall below that at which the molten glass particles can adhere, not only is formation of deposits or aggregates on the walls avoided but also the presence of this cooled wall is not a notable hindrance to obtaining the necessary high temperature conditions. Considering the glasses to be used, the wall temperature is advantageously kept below 150° C.

Tempering is achieved in an enclosure 4 of relatively large volume in relation to that of the combustion chamber 8 and extension chamber 3. The tempering air is admitted to the upper part of this enclosure by openings 9. The gases and particles coming from extension chamber 3 also come out into this upper part. Intake of the air into the tempering chamber 4 is regulated by suction maintained at the end of the elements of the apparatus used for separation of gases and solids. Lowering of the temperature of the circulating gases, as a result of the introduction of ambient air, is completed during travel in the tempering enclosure by heat exchanges that are performed by the walls of this enclosure in contact with the ambient air.

In the tempering enclosure, the cross-section is also sufficient to reduce the speed of circulation of the gases. This reduction in speed makes it possible, to perform a first dynamic sorting at the bottom of the enclosure. The coarser particles essentially formed by aggregates are deposited in preselector 10. Under the working conditions indicated above, the fraction of initial product forming aggregates normally does not exceed 1 to 2% by weight of the initial product.

The various sections in the preselector and the suction conditions are also regulated such that the expanded particles are entrained out of the preselector by the gases and are deposited in one or more means used to separate the particles from the gases that transport them. In FIG. 1, these means consist of two cyclones 5 and 6 and a bag filter device 7 whose output is connected to a conventional suction fan 32. Recovery of the microspheres is performed at the bottom of the cyclones and bag filters. As a function of the characteristics of the separation means and the speed of circulation of the gases, it is possible to achieve a sorting of the particles. Thus, normally, the finer particles are separated at the bag filters.

Although illustrative embodiments of the invention have been described herein, it is to be understood that the invention is not limited to such embodiments. Rather, various modifications and variations thereon will occur to those skilled in the art within the spirit and scope of the invention, as defined by the claims.

We claim:

1. A process for producing hollow microspheres from particles of soda-lime-silica glass containing between about 0.01 and 0.05 weight precent sulfur in the form of sulfate compounds comprising:
   (a) passing the particles in a reducing atmosphere through a burner for treatment at a temperature at least about 100° C. above the normal working temperature at which said glass is manufactured but below about 1750° C.; and
   (b) forming hollow microspheres by reducing the sulfates to sulfur dioxide gas which is insoluble in the glass and which causes expansion of the particles.

2. A process as in claim 1, wherein the treatment temperature is at least about 1500° C.

3. A process as in claim 2, wherein the treatment temperature is about 1550°–1700° C.

4. A process as in claim 1, wherein the treatment temperature is less than about 1700° C.

5. A process for producing hollow microspheres from particles of soda-lime-silica glass containing between about 0.01 and 0.5 weight percent sulfur in the form of sulfate compounds comprising:
   (a) passing the particles in a reducing atmosphere through a burner for treatment at a temperature at least about 100° C. above the normal working temperature at which said glass is manufactured but below about 1750° C.;
   (b) maintaining said particles at the treatment temperature for less than about 0.1 second;
   (c) forming hollow microspheres by reducing the sulfates to sulfur dioxide gas which is insoluble in the glass and which causes expansion of the particles; and
   (d) solidifying the hollow microspheres by sudden cooling.

6. A process as in claim 5, wherein said particles are cooled to below about 1000° C.

7. A process as in claim 6, wherein said particles are cooled to below about 750° C.

8. A process as in claim 5, wherein said particles are maintained at the treatment temperature for less than about 0.05 sec.

9. A process as in claim 5, wherein said particles are less than about 20 microns in size before treatment, and are maintained at the treatment temperature for less than about 0.02 sec.

10. A process as in claim 1, further comprising
(a) operating the burner with a mixture of air and fuel gas fed into the burner such that the air factor (the ratio of the amount of air introduced into the burner to the amount of air necessary to produce stoichiometric combustion) is less than about 1.1.

11. A process as in claim 10, wherein the air factor is less than about 1.05.

12. A process as in claim 11, wherein the air factor is greater than about 0.75.

13. A process as in claim 12, wherein the air factor is between about 0.8 and 0.95.

14. A process as in claim 10, wherein the air factor is greater than about 0.75.

15. A process as in claim 1, further comprising
(a) operating the burner with a mixture of air and fuel gas fed into the burner with an air factor (the ratio of the amount of air introduced into the burner to the amount of air necessary to produce stoichiometric combustion) selected such that the instantaneous level of hydrogen released by cracking of the fuel is less than about 4% of the gases in the burner.

16. A process as in claim 15, wherein said instantaneous level of hydrogen is less than about 3%.

17. A process for producing hollow microspheres from particles of soda-lime-silica glass containing between about 0.01 and 0.5 weight percent sulfur in the form of sulfate compounds comprising:
(a) passing the particles through a burner for treatment at a temperature at least 100° C. above the normal working temperature at which said glass is manufactured but below about 1750° C.; and
(b) feeding fuel gas and oxidizing gas into the path of the particles through the burner such that the particles pass first through a first zone having a reducing atmosphere and then through a second zone having a non-reducing atmosphere; wherein the reducing atmosphere causes the sulfate compounds to decompose to sulfur dioxide which is insoluble in the glass and causes expansion of the particles and formation of hollow microspheres.

18. A process as in claim 17, wherein said second zone has a neutral atmosphere.

19. A process as in claim 17, wherein said second zone has a slightly oxidizing atmosphere.

20. A process as in claim 1, wherein the average size of the particles treated is about 7-50 microns.

21. A process as in claim 20, wherein the average size of the particles treated is less than about 10 microns.

22. A process as in claim 1, wherein the sulfur content by weight in said glass is less than about 0.1%.

23. A process as in claim 22, wherein said sulfur content is greater than about 0.01%.

24. A process for producing hollow microspheres from particles of soda-lime-silica glass containing between about 0.01 and 0.5 weight percent sulfur in the form of sulfate compounds, comprising:
(a) passing the particles through a burner for treatment at a temperature at least about 100° C. above the normal working temperature at which said glass is manufactured but below about 1750° C.;
(b) operating the burner with a mixture of air and fuel gas fed into the burner such that the air factor is less than about 1.1;
(c) maintaining said particles at the treatment temperature for less than about 0.1 second;
(d) forming micropheres by reducing the sulfates to sulfur dioxide gas which is insoluble in the glass and which causes expansion of the particles; and
(e) solidifying the hollow microspheres by sudden cooling to a temperature of between about 750° and 1000° C.

25. A process as in claim 24, further comprising
(a) feeding fuel gas and oxidizing gas into the path of the particles through the burner such that the particles pass first through a first zone with a reducing atmosphere and then through a second zone with a non-reducing atmosphere.

26. A process as in claim 24 or claim 25, wherein the treatment temperature is about 1550°-1700° C., and the burner is operated with an air factor of about 0.8-0.95.

27. A process as in claim 26, wherein the particles are maintained at the treatment temperature for less than about 0.05 second, and the particles are solidified by sudden cooling to below about 750° C.

28. A process for producing hollow microspheres from particles of soda-lime-silica glass containing between about 0.01 and 0.5 weight percent sulfur in the form of sulfate compounds comprising:
(a) passing the particles through a burner for treatment at a temperature of at least about 100° C. above the normal working temperature at which said glass is manufactured and above at least about 1500° C. but below about 1700° C.;
(b) operating the burner with a mixture of air and fuel gas fed into the burner such that the air factor is between about 0.75 and 1.1 and such that the instantaneous level of hydrogen released by cracking of the fuel is less than about 4% of the gases in the burner;
(c) feeding fuel gas and oxidizing gas into the path of the particles through the burner such that the particles pass first through a first zone having a reducing atmosphere and then through a second zone having a non-reducing atmosphere;
(d) maintaining said particles at the treatment temperature for less than about 0.1 second;
(e) forming micropheres by reducing the sulfates to sulfur dioxide gas which is insoluble in the glass and which causes expansion of the particles; and
(f) solidifying the particles by sudden cooling to a temperature of about 750° to 1000° C.

29. A process for producing hollow microspheres from parties of soda-line-silica glass containing between 0.01 and 0.5 weight percent sulfur in the form of sulfate compounds which comprises:
heating the particles in a reducing atmosphere by passing the particles through a burner at a sufficient temperature and for a sufficient time to decompose the sulfate compounds to sulfur dioxide and cause formation of hollow microspheres; and
rapidly cooling the microspheres to retain their shape.

30. The method of claim 29 wherein the particles are heated at a temperature range of at least about 100° C. above the normal working temperature at which said glass is manufactured but below about 1750° C.

31. The method of claim 29 wherein the particles are heated for less than 0.01 second.

32. The method of claim 29 wherein the microspheres are rapidly cooled to a temperature of between 750° and 1000° C.

33. The method of claim 29 wherein the particles pass through a zone of a neutral or oxidizing atmosphere before being rapidly cooled.

34. The method of claim 29 wherein the burner is operated with an air factor of between 0.75 and 1.1.

* * * * *